US012505964B2

(12) United States Patent
Jordan et al.

(10) Patent No.: US 12,505,964 B2
(45) Date of Patent: Dec. 23, 2025

(54) INPUT DEVICE WITH SIMPLIFIED INSTALLATION OF THE ASSOCIATED CONTACT PART, WHICH IS MOUNTED IN A VIBRATION-CAPABLE MANNER, AND ASSOCIATED ASSEMBLY METHOD

(71) Applicant: Preh GmbH, Bad Neustadt a.d. Saale (DE)

(72) Inventors: Michael Jordan, Dipperz (DE); Thilo Schultheis, Bad Neustadt a.d. Saale (DE); Joachim Wuest, Hohenroth (DE)

(73) Assignee: Preh GmbH, Bad Neustadt a.d. Saale (DE)

( * ) Notice: Subject to any disclaimer, the term of this patent is extended or adjusted under 35 U.S.C. 154(b) by 211 days.

(21) Appl. No.: 18/180,990

(22) Filed: Mar. 9, 2023

(65) Prior Publication Data

US 2023/0290583 A1 Sep. 14, 2023

(30) Foreign Application Priority Data

Mar. 9, 2022 (DE) ......................... 102022105530.2

(51) Int. Cl.
*H01H 3/38* (2006.01)
*H01H 1/14* (2006.01)
*H01H 9/02* (2006.01)

(52) U.S. Cl.
CPC ................ *H01H 3/38* (2013.01); *H01H 1/14* (2013.01); *H01H 9/02* (2013.01)

(58) Field of Classification Search
CPC ........... H01H 2001/00; H01H 2001/12; H01H 2001/24; H01H 2001/247; H01H 2001/26; H01H 2001/265; H01H 2001/50; H01H 2003/08; H01H 2221/00; H01H 2221/01; H01H 2221/06; H01H 2231/026; H01H 9/02; H01H 19/00; H01H 19/02; H01H 19/08; H01H 19/10; H01H 19/14; H01H 21/00; H01H 21/02; H01H 21/04;
(Continued)

(56) References Cited

U.S. PATENT DOCUMENTS 11,282,446 B2 * 3/2022 Curtis .................. G09G 3/3208
2011/0205038 A1 * 8/2011 Drouin .................. G06F 3/0362
340/407.2

FOREIGN PATENT DOCUMENTS

DE 102006036636 A1 * 2/2007 ............. G05G 5/005
DE 102020108495 A1 9/2021

OTHER PUBLICATIONS

"German Office Action for DE 10 2022 105 530.2" Dated Oct. 25, 2022. Deutsches Patent-und Markenamt, Munich, Germany.

* cited by examiner

*Primary Examiner* — Anthony R Jimenez
(74) *Attorney, Agent, or Firm* — M&B IP Analysts, LLC

(57) ABSTRACT

The present disclosure relates to an input device, including a carrier; a contact part; a spring disposed between the carrier and the contact part, wherein the spring is adapted to mount the contact part on the carrier in an, along a deflection direction ($R_A$), elastically self-resetting and a vibration-capable manner; wherein the spring is configured such that it is fixed by a positive fit by an insertion in a first direction into at least one carrier-side first accommodating portion of the carrier, and that it is fixed on the contact part by a positive fit by an insertion in a second direction into at least one contact part-side second accommodating portion.

15 Claims, 2 Drawing Sheets

(58) Field of Classification Search

CPC .. H01H 3/00; H01H 3/02; H01H 3/08; H01H 3/10; H01H 3/38; H01H 1/14

USPC ........................................................ 200/52 R

See application file for complete search history.

INPUT DEVICE WITH SIMPLIFIED INSTALLATION OF THE ASSOCIATED CONTACT PART, WHICH IS MOUNTED IN A VIBRATION-CAPABLE MANNER, AND ASSOCIATED ASSEMBLY METHOD

The present disclosure relates to an input device, which comprises a carrier and a contact part, which is mounted on the carrier in a vibration-capable manner by means of a spring means. The vibration-capable mounting of the contact part is provided, for example, in order to cause a displacement of the contact part from a rest position into an actuated position by manually moving the contact part, which is also considered an actuation. As a rule, detection means are provided for this purpose, in order to detect at least one of the respective positions of the contact part or at least a change of position of the contact part. In addition or as an alternative, a vibration-capable mounting may be provided in order to selectively cause an excitation of movement or vibration of the contact part by means of an actuator in order to generate a haptic feedback, e.g. for acknowledging in a haptically perceptible manner the actuation previously carried out. The vibration-capable mounting of the contact part responds sensitively to a deviation from the ideal orientation and thus makes the installation of the input device highly demanding; otherwise, there is a risk of troublesome mechanical impact noise when generating the haptic feedback. Moreover, the vibration-capable attachment of the contact part is supposed to be configured so as to be resistant to vandalism and safely exclude damage due to operating errors, in order to largely exclude a risk of injury. Moreover, solutions for a vibration-capable mounting are desired which save construction space and weight and enable a high integration density.

Therefore, the present disclosure is based on the object of providing an input device with a contact part mounted in a vibration-capable manner, particularly for generating a haptic feedback, which exhibits a reproducible vibration behavior, is protected against vandalism, is designed to be light and space-saving, and is also comparatively easy to install. According to the present disclosure, the object is achieved by an input device with the features of claim 1. An equally advantageous assembly method and a use are each the subject matter of the independent claims. The features and measures cited individually in the following description can be combined with each other in any technologically meaningful manner and present other embodiments of the disclosed embodiments. The description, in particular in connection with the Figures, additionally characterizes and specifies the disclosed embodiments.

The input device according to the present disclosure comprises a carrier. The term "carrier" is to be interpreted broadly and generally serves the function of fixing and retaining the input device, for example on an inner trim, a center console or a dashboard of a motor vehicle. For example, the carrier is formed from a plastic, such as a thermoplastic material, a metallic alloy, such as ZAMAK, or a metal. The carrier may serve for attaching and/or movably mounting a further contact part or an optical display device, so generally: in addition to the contact part, which is described below in accordance with the present disclosure, additional elements for the further transfer of information and/or interaction with an operator may be mounted on or attached to the carrier, so that the input device is qualified as a man-machine interface in almost any configuration.

According to the present disclosure, therefore, a contact part is provided which is mounted on the carrier in an, along a deflection direction, elastically self-resetting, vibration-capable manner by means of a spring means disposed between the carrier and the contact part. For example, the contact part forms a contact and/or operating surface facing towards the operator, and the deflection direction is substantially orthogonal to the contact and/or operating surface. The contact and/or operating surface has a round configuration, for example. For example, the contact part is formed from a plastic, such as a thermoplastic material, a metallic alloy, such as ZAMAK, or a metal. In one embodiment, the contact part is formed in at least some portions from a transparent or translucent plastic and covers an optical display, for example, such as a backlit luminous surface of a function display or an electronic pixel matrix display, which is fixed on the carrier, for example.

According to the present disclosure, the spring means is configured such that it is fixed on the carrier by positive fit, e.g. in the form of a bayonet connection, by insertion in a first direction into at least one carrier-side first accommodating portion, and that it is fixed on the contact part by positive fit, e.g. in the form of a bayonet connection, by insertion in a second direction into at least one contact part-side second accommodating portion. Preferably, the positive fit is accomplished in each case by fixing the spring means on all sides in the first and second accommodating portions. Preferably, the spring means is a spring steel sheet and is configured as a laser cut part or stamped part. In the non-installed state, the spring steel sheet preferably has a flat configuration and thus has no bending edges, which increases the durability of the spring means, but also increases the reproducibility of the spring action and therefore that of the vibration behavior, because the manufacturing steps with respect to the spring means are limited to a minimum, i.e. the cutting. Due to the fact that the spring means are introduced only by an inserting introduction into the associated accommodating portions from amongst the first and second accommodating portions, the installation can be realized reliably and quickly. A jamming of the spring means due to assembly can be excluded. Moreover, space and weight are saved because the fixing of the spring means on the carrier on all sides, on the one hand, and on the contact part on the other hand is achieved by means of a simple relative movement.

Preferably, the first direction and the second direction point in the same direction or are opposite to each other. More preferably, the first and second directions are opposite to each other, and thus include an angle of 180°. Preferably, the first direction and the second direction are each orthogonal to the deflection direction.

According to a preferred embodiment, the spring means is configured such that, further, it is fixed in the first accommodating portion and/or the second accommodating portion by latching, e.g. by a combination of a bayonet connection with latching together, latching behind, snap-in latching, spreading snap-in latching or the like.

Preferably, the carrier, the contact part and the spring means are configured such that, after loosely disposing the spring means between the carrier and the contact part, the spring means can be fixed on the contact part by moving the contact part in the opposite direction to the second direction, and the contact part can be fixed via the spring means on the carrier by moving the contact part and the spring means, together, in the first direction.

Preferably, the spring means is configured as an integrally formed spring sheet part with a connecting web and with several first arms for insertion into, in each case, one of the first accommodating portions, and with several second arms for insertion into, in each case, one of the second accommodating portions. For example, the arms serve for fixing, while the connecting web serves exclusively for the vibration-capable elastic mounting.

Preferably, the first arms are all rooted in a first edge of the connecting web and the second arms are all rooted in a second edge of the connecting web opposite the first edge. For example, the first and second arms protrude in a perpendicularly cranked shape from the connecting web, wherein the free end of the first and the second arm points in a direction parallel to the extending direction of the connecting web.

Preferably, the connecting web is configured in a manner meandering about the first and second arms.

Preferably, the positive fixing is accomplished by a free end of the first arm snapping in behind a carrier-side first latching tab, and a free end of the second arm snapping in behind a contact part-side second latching tab.

According to a preferred embodiment, the connecting web is configured as a ring, wherein the first direction, in which the fixing of the spring means on the carrier takes place, corresponds to a circumferential direction of the ring, and the second direction, in which the fixing of the spring means on the contact part takes place, corresponds to an opposite circumferential direction of the ring.

Preferably, the first arms and the second arms are arranged in a uniformly distributed manner along the circumference of the ring, wherein their free ends extend along the circumferential direction. In this case, it is provided that the free ends of the first arms and the free ends of the second arms point in opposite directions.

Preferably, further, an electrically controllable actuator is provided, which is configured for driving the contact part along the deflection direction for generating a haptic feedback. For example, an electro-motive or electromagnetic actuator is provided. For example, the actuator is supported by the carrier. According to an alternative embodiment, the actuator is fixed exclusively on the contact part.

According to one embodiment, the contact part is configured to be touch-sensitive. For example, a part of the input device defining an input surface facing towards the operator is provided, on which a touch by means of an input means or a finger of the operator is detected, preferably detected in a spatially resolving manner, by means of a sensor system. Preferably, the touch-sensitive contact part is a touchpad, i.e. a displayless contact part with a spatially resolving detection of a touch on an input surface associated with the contact part or a touchscreen, i.e. a contact part with a spatially resolving detection of a touch on an input surface associated with the contact part, wherein in the latter case, an electronic display, particularly an electronic pixel matrix display, is associated with the input surface.

As was mentioned above, the vibration-capable, elastically self-resetting mounting of the actuating part on the carrier may be provided in order to enable an excitation of movement of the actuating part by an actuator in order to provide a haptic feedback. Alternatively or additionally, the elastically self-resetting degree of freedom of movement may be provided in order to enable an actuation, such as depressing the contact part. According to a preferred embodiment, consequently, detection means are provided, in order to detect at least one of the respective positions of the contact part or at least a change of position of the contact part. In one embodiment, an electromechanical switch is provided, whose switching state changes upon reaching the actuated position, for example. In another embodiment, a force sensor is provided, such as a capacitive force sensor.

Furthermore, the present disclosure relates to the use of the input device in one of the previously described configurations in a motor vehicle.

The present disclosure further relates to an assembly method for an input device, which comprises the following steps. According to the assembly method according to the present disclosure, a spring means is provided in a step of providing. According to the present disclosure, a carrier is provided in a further step of providing, which has a first accommodating portion for insertion of the spring means in a first direction and for positively fixing the spring means. According to the present disclosure, there is provided a contact part with a second accommodating portion for insertion of the spring means in a second direction and for positively fixing the spring means. In a subsequent step of arranging, the spring means is loosely arranged between the carrier and the contact part.

By subsequent movement, preferably rotary movement, of the contact part in the opposite direction to the second direction in order to insert the spring means into the second accommodating portion and fix it on the contact part by positive fit, and by simultaneous or subsequent movement, preferably rotary movement, of the contact part together with the spring means in the first direction in order to insert the spring means into the first accommodating portion and fix it on the carrier by positive fit, it is accomplished that, by means of the spring means, the contact part is mounted on the carrier in an, along a deflection direction, elastically self-resetting, vibration-capable manner.

Preferably, the first direction and the second direction point in the same direction or are opposite to each other. More preferably, the first and second directions are opposite to each other, and thus include an angle of 180°. Preferably, the first direction and the second direction are each orthogonal to the deflection direction.

With respect to further configurations and modifications of the assembly method according to the present disclosure, reference is made to the previous explanations concerning the input device. According to a preferred embodiment, the spring means, among other things, is configured such that it is fixed in the first accommodating portion and/or in the second accommodating portion by latching.

The various embodiments as well as the technical environment will be explained in more detail below with reference to the Figures. It must be remarked that the Figures depict an example embodiment of various embodiments, but that the present disclosure is not limited thereto. The Figures schematically show:

Figure 1:
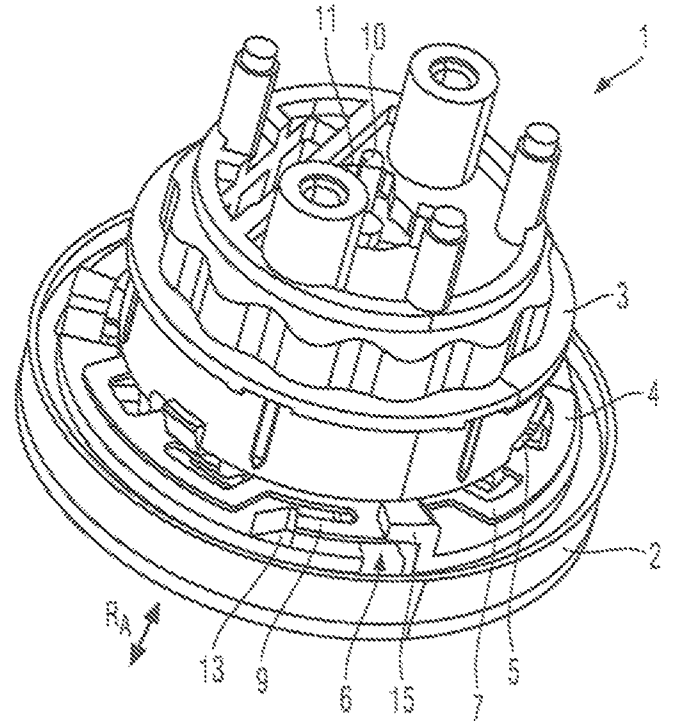
FIG. 1 shows a perspective rear view of an embodiment of the input device 1 according to an embodiment.

FIG. 1 shows an embodiment of the input device 1 according to the disclosed embodiment. It has a carrier 3 serving for the attachment of the input device 1 to a center console, which is not shown, or a dashboard, which is not shown, of a motor vehicle. A contact part 2 is mounted on the carrier 3 in an elastically self-resetting and vibration-capable manner in the deflection direction $R_A$. This degree of freedom is provided, for example, in order to enable a detectable actuation of the contact part 2, i.e. a manually effected and registrable displacement of the contact part, and/or to enable an excitation of movement of the contact part in the deflection direction $R_A$ in order to generate a feedback that is haptically perceptible for the operator. The contact part 2 is mounted on the carrier 3 in an, along the deflection direction $R_A$, elastically self-resetting, vibration-capable manner by means of a spring means 4 disposed between the carrier 3 and the contact part 2. For example, the contact part 2 forms a contact and/or operating surface facing towards the operator, which is not visible in the illustration of FIG. 1. The deflection direction $R_A$ is substantially orthogonal to the contact and/or operating surface. The contact and/or operating surface has a round configuration, for example. For example, the contact part 2 is formed from a plastic, such as a thermoplastic material, a metallic alloy, such as ZAMAK, or a metal. In one embodiment, the contact part 2 is formed in at least some portions from a transparent or translucent plastic and covers an optical display, for example, such as a backlit luminous surface of a function display or an electronic pixel matrix display, which is fixed on the carrier 3, for example.

The carrier 3 may serve for attaching and/or movably mounting a further contact part or an optical display device. For example, the carrier 3 exhibits in FIG. 1 a latching contour for the operative engagement with a latching spring, which is not shown and which is provided on a rotating ring for a manual rotary input that is rotatably mounted on the carrier 3. So generally: in addition to the contact part 2, which is described below in accordance with the embodiment, additional elements for the further transfer of information and/or interaction with an operator may be mounted on or attached to the carrier 3, so that the input device 1 is qualified as a man-machine interface in almost any configuration.

Figure 2:
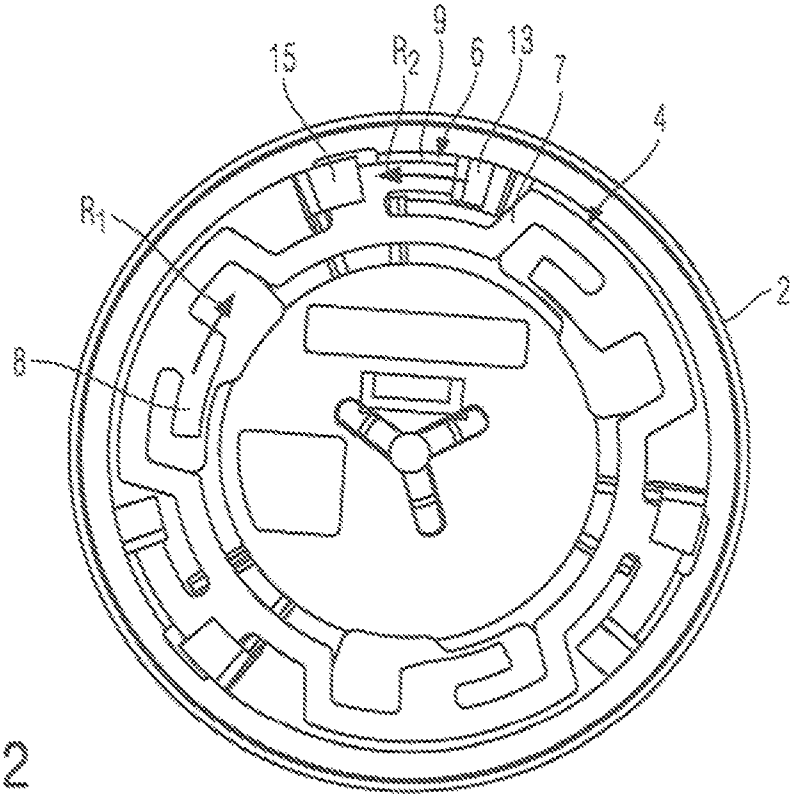
FIG. 2 shows a rear view of the contact part 2 with a spring means 4 fixed thereto.
Figure 3:
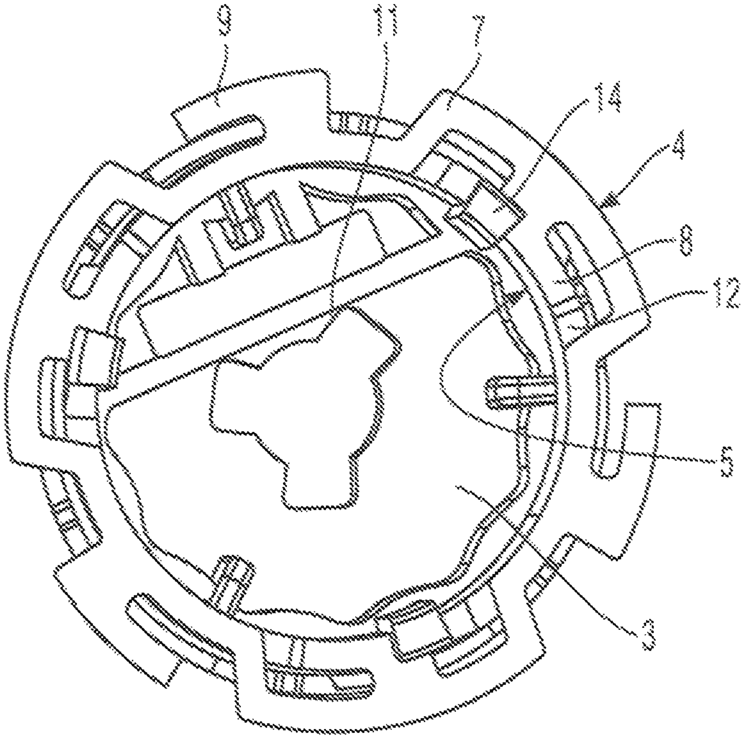
FIG. 3 shows a perspective view of the carrier 3 with a spring means 4 fixed thereto.

As becomes clear from FIGS. 2 and 3, the spring means 4 is configured such that it is fixed on the carrier 3 by positive fit in the form of a bayonet connection, by insertion in a first direction $R_1$ into several carrier-side first accommodating portions 5, and that it is fixed on the contact part 2 by positive fit in the form of a bayonet connection, by insertion in a second direction $R_2$ into several contact part-side second accommodating portions 6. As is clear from FIG. 2, the first direction $R_1$ and the second direction $R_2$ are opposite to each other, and thus include an angle of 180°. At the same time, the first direction $R_1$ and the second direction $R_2$ are each orthogonal to the deflection direction $R_A$.

Figure 4:
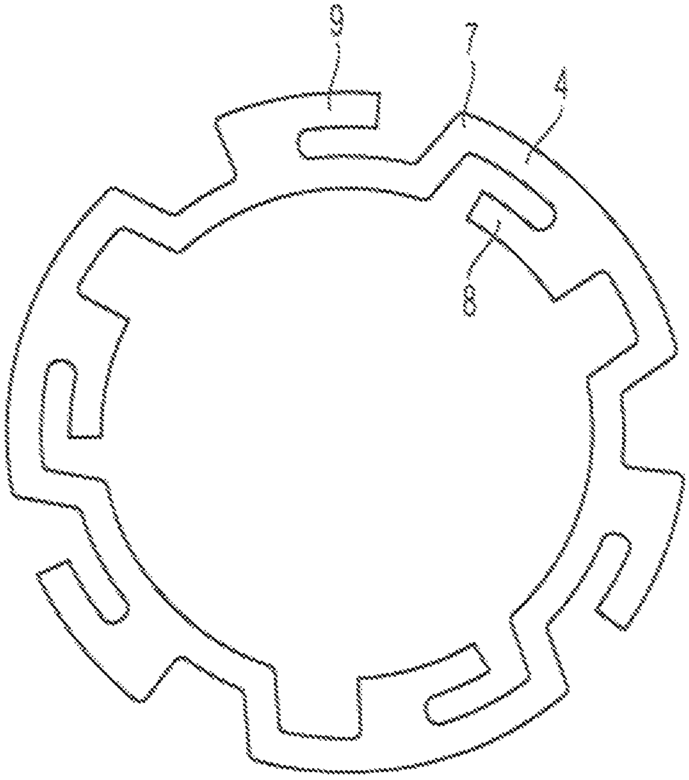
FIG. 4 shows a top view of the spring means 4.

A positive fixation of the spring means 4 on all sides in the first accommodating portion 5 and the second accommodating portion 6 is accomplished by an additional latching of the spring means 4. The spring means 4, which is shown in detail in FIG. 4, is a spring steel sheet and, in the non-installed state, has a flat configuration and thus has no bending edges, which increases the durability of the spring means 4, but also increases the reproducibility of the spring action and therefore that of the vibration behavior, because the manufacturing steps with respect to the spring means 4 are limited to a minimum, i.e. the cutting. The spring means 4 has a one-piece configuration and has a substantially annular connecting web 7 and several first arms 8 for insertion into, in each case, one of the first accommodating portions 5 of the contact part 2, and several second arms 9 for insertion into, in each case, one of the second accommodating portions 6 of the carrier 3. Here, the first arms 8 and the second arms 9 serve for fixing, while the connecting web 7 serves exclusively for the vibration-capable elastic mounting. As is most clearly recognizable in FIG. 4, the first arms 8 are all rooted in a radially inner first edge of the connecting web 7, and the second arms 9 are all rooted in a radially outer second edge of the connecting web 7 opposite the first edge. The first arms 8 and second arms 9 each protrude in a perpendicularly cranked shape from the connecting web 7, while the substantially annular connecting web 7 is configured so as to meander about the first arms 8 and the second arms 9. In this case, the first arms 8 and the second arms 9 are arranged in a uniformly distributed manner along the circumference of the ring formed by the connecting web 7, wherein the free ends of the first arms 8 and the second arms 9 extend along the circumferential direction, but the free ends of the first arms 8 and the free ends of the second arms 9 are different from each other in that they point in opposite directions. As can be seen in FIGS. 2 and 3, the positive fixing of the first arms 8 and the second arms 9 is accomplished by the free end of the first arm 8 respectively snapping in behind a carrier-side first latching tab 12 and the free end of the second arm 9 respectively snapping in behind a contact part-side second latching tab 13.

Due to the fact that the spring means 4 are introduced only by an inserting introduction into the associated accommodating portions from amongst the first accommodating portion 5 and the second accommodating portion 6, the installation can be realized reliably and quickly. Moreover, space and weight are saved because the fixing of the spring means 4 on the carrier 3 on all sides, on the one hand, and on the contact part 2 on the other hand is achieved by means of a simple relative movement. As is clear from the Figures, the carrier 3, the contact part 2 and the spring means 4 are configured such that, after loosely disposing the spring means 4 between the carrier 3 and the contact part 2, the spring means 4 can be fixed on the contact part 2 by twisting the contact part 2 in the opposite direction to the second direction $R_2$, and the contact part 2 can be fixed via the spring means 4 on the carrier 3 by twisting the contact part 2 and the spring means 4, together, in the first direction $R_1$. In order to avoid overtwisting the input part 2 and damage to the spring means 4 and/or the first accommodating portions 5 and/or the second accommodating portions 6, stop means 10, 11 are provided, here in the form of a contact part-side projection 10, which reaches into a carrier-side recess 11.

What is claimed is:

1. An input device, comprising:

a carrier;

a contact part; and a spring disposed between the carrier and the contact part, wherein the spring is adapted to mount the contact part on the carrier in an, along a deflection direction ($R_A$), elastically self-resetting and a vibration-capable manner;

wherein the spring is fixed by a positive fit by an insertion in a first direction ($R_1$) into at least one carrier-side first accommodating portion of the carrier, and that it is fixed on the contact part by a positive fit by an insertion in a second direction ($R_2$) into at least one contact part-side second accommodating portion;

wherein the spring is configured as an integrally formed spring sheet part with a connecting web and with a plurality of first arms for insertion into, in each case, one of the at least one first accommodating portion, and with a plurality of second arms for insertion into, in each case, one of the at least one second accommodating portion; and wherein the connecting web is configured as a ring, and the first direction ($R_1$) corresponds to a circumferential direction of the ring, and the second direction ($R_2$) corresponds to an opposite circumferential direction of the ring.

2. The input device according to claim 1, wherein the first direction ($R_1$) and the second direction ($R_2$) point in an opposite direction to each other.

3. The input device according to claim 1, wherein the first direction ($R_1$) and the second direction ($R_2$) are orthogonal to the deflection direction ($R_A$).

4. The input device according to claim 1, wherein the spring is configured such that it is fixed by latching in at least one of: the at least one first accommodating portion and the at least one second accommodating portion.

5. The input device according to claim 1, wherein the carrier, the contact part and the spring are configured such that, after initially disposing the spring between the carrier and the contact part in a non-fixed manner, the spring is fixed on the contact part by moving the contact part in the opposite direction to the second direction ($R_2$), and the contact part can be fixed via the spring on the carrier by moving the contact part together with the spring in the first direction ($R_1$).

6. The input device according to claim 1, wherein the plurality of first arms are all rooted in a first edge of the connecting web and the plurality of second arms are all rooted in a second edge of the connecting web opposite the first edge.

7. The input device according to claim 1, wherein the connecting web is configured so as to meander about the plurality of first arms and the plurality of second arms.

8. The input device according to claim 1, wherein a free end of each of the plurality of first arms snaps in, respectively, behind a carrier-side first latching tab, and a free end of each of the plurality of second arms snaps in, respectively, behind a contact part-side second latching tab.

9. The input device according to claim 1, wherein the plurality of first arms and the plurality of second arms are arranged in a uniformly distributed manner along a circumference of the connecting web configured as a ring, and free ends of the plurality of first arms and free ends of the plurality of second arms extend along the circumferential direction of the ring, wherein the free ends of the plurality of first arms and the free ends of the plurality of second arms point in opposite directions.

10. The input device according to claim 1, further comprises an electronic pixel matrix display, wherein the contact part is configured to accommodate the electronic pixel matrix display in a fixing manner.

11. The input device according to claim 1, further comprises an electrically controllable actuator, wherein the electrically controllable actuator is configured to drive the contact part along the deflection direction to generate a haptic feedback.

12. The input device according to claim 1, wherein the input device is used in a motor vehicle.

13. An assembly method for an input device with the following steps:

loosely arranging a spring between a carrier and a contact part, the carrier having at least one first accommodating portion for insertion of the spring in a first direction ($R_1$) and for positively fixing the spring and the contact part having at least one second accommodating portion for insertion of the spring in a second direction ($R_2$) and for positively fixing the spring; and moving the contact part in an opposite direction to the second direction to insert the spring into the second accommodating portion and fix it on the contact part by positive fit, and moving the contact part together with the spring in the first direction to insert the spring into the first accommodating portion and fix it on the carrier by positive fit, wherein the contact part is mounted on the carrier by the spring in an, along a deflection direction ($R_A$), elastically self-resetting and vibration-capable manner;

wherein the spring is configured as an integrally formed spring sheet part with a connecting web and with a plurality of first arms for insertion into, in each case, one of the at least one first accommodating portion, and with a plurality of second arms for insertion into, in each case, one of the at least one second accommodating portion; and wherein the connecting web is configured as a ring, and the first direction ($R_1$) corresponds to a circumferential direction of the ring, and the second direction ($R_2$) corresponds to an opposite circumferential direction of the ring.

14. The assembly method according to claim 13, wherein the first direction ($R_1$) and the second direction ($R_2$) point in an opposite direction to each other.

15. The assembly method according to claim 14, wherein movements of the contact part are, in each case, a rotary movement.

* * * * *